F. D ROBINSON.

Assignor to A. M. ROBINSON.

Latches for Doors.

No. 8,008. Reissued Dec. 25, 1877.

WITNESSES.

Geo. W. Cummings

Thos. G. Banks.

INVENTOR.

Francis D. Robinson

N. PETERS, PHOTO-LITHOGRAPHER, WASHINGTON, D. C.

UNITED STATES PATENT OFFICE.

FRANCIS D. ROBINSON, OF BOSTON, MASSACHUSETTS, ASSIGNOR TO ALBERT M. ROBINSON, OF SAME PLACE.

IMPROVEMENT IN LATCHES FOR DOORS.

Specification forming part of Letters Patent No. 161,705, dated April 6, 1875; Reissue No. 8,008, dated December 25, 1877; application filed August 22, 1876.

*To all whom it may concern:*

Be it known that I, FRANCIS D. ROBINSON, of Boston, Suffolk county, Massachusetts, have invented certain Improvements in Latches for Doors, &c., of which the following is a specification:

This invention relates to means whereby the resistance offered by the latch-bolt of a lock or latch, upon the closing of the door or other object to which it is attached, is very greatly reduced, and the bolt under all circumstances is compelled to recede so soon as the front edge of the door enters the rabbet in the door-frame.

Latch-bolts have heretofore been provided with devices for forcing the bolt into the case independently of the contact with a nosing or striker-plate of the inclined face on the latch-bolts.

Latches embodying my invention differ from all others heretofore known to me, in that I employ therein a bolt-operating lever which is provided with a striking-face, which projects at an abrupt angle from the face-plate of the case, and is so pivoted that its outer end, in the act of forcing back the bolt, moves in the arc of a circle more rapidly than the bolt moves in receding; also, in that my operating-lever is practically a bell-crank lever, which is operatively connected with the bolt and case by means of a single pivot, and therefore it moves the bolt longitudinally without imparting thereto any lateral movement; also, in that the striking-face of the operating-lever is parallel with the holding-face of the latch-bolt; also, in that the latch-bolt is connected with the lever by a pin-and-slot connection; and, also, still further, in that the latch-bolt is provided with an angular edge, against which the operating-lever abuts in forcing back the bolt.

It is owing to these novel features in the construction of my operating-lever, and to the novel and peculiar manner in which it is combined with the latch-bolt and case, that my improved latches are applicable to thin mortise-locks, are prompt and easy in operation, are durable, and so occupy a keeper-mortise as to obviate the undue rattling of a latched door.

Figure 1:
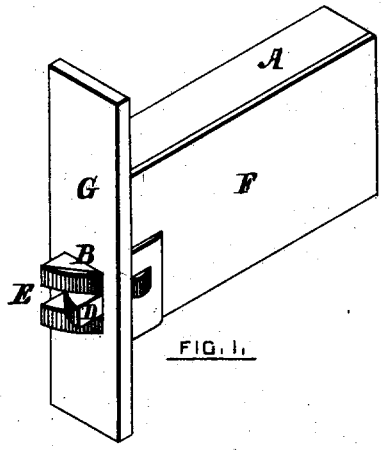
Figure 2:
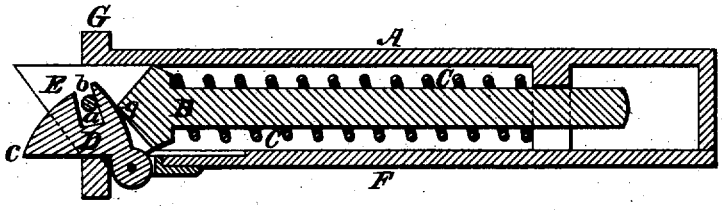

The drawings accompanying this specification represent, in Figure 1 a perspective view, and in Fig. 2 a horizontal section, of a door-latch provided with my improvement.

In these drawings, A represents the case, and B the latch-bolt, of an ordinary door-latch, the spring which advances the bolt in the usual manner being shown at C.

The bolt B is well fitted to the case, and is capable only of longitudinal movement.

In carrying out my improvement, I produce, from a flat block of metal, a latch-operating lever, D, of the form shown in Fig. 2 of the drawings, and I dispose this lever within a horizontal furcation, E, Fig. 1, made in the outer end of the bolt B, the inner end of the lever D being pivoted to the plate F of the case A a short distance in rear of the face-plate G of the latter, while the outer end or nose *c* of the said lever D protrudes beyond the said face-plate to an extent about equal to the projecting portion or nose of the bolt B.

The striking-face of lever D projects at an abrupt angle from the face-plate of the case, and it will be seen that it is so pivoted that its outer end, moving in the arc of a circle, will move more rapidly than the bolt, because said outer end is farther from the pivot than is the point of contact of the lever with the bolt, and the power of the bolt-spring is easily overcome, because the closing force of the door is applied to the longest arm of the lever, and transmitted to the bolt through its shortest arm. This lever is a bell-crank lever, and it is operatively connected with the case and bolt by a single pivot, which is located near the junction of the lever-arms, and therefore the bolt has only a movement to and fro in a straight line, without that lateral vibratory movement of its outer end which would result from the pivoting of a lever both to bolt and case, as has heretofore been done. This single pivot permits the outer end of the lever to travel faster than the bolt, which results in a gaining leverage in overcoming the power of the bolt-spring. The striking-face of the lever being practically parallel with the holding-face of the bolt, the two co-operate with the sides of the keeper-mortise in holding a closed door against undue vibration.

A bar, *a*, spans the furcation E of the bolt B at a point to intercept or enter a notch, *b*, created in the upper part of the lever D, the purpose of such bar being to enable the said bolt, when retracted by the knob, to compel the lever D to retreat within the interior of the case A. The rear side or spur *b* of the lever D abuts against the rear wall or boundary of the furcation E of the bolt B, and serves to retract such bolt, as hereinafter stated; and to lessen the friction between the lever and bolt as much as possible, I reduce the portion of the bolt against which the spur abuts to an obtuse-angled edge, as shown at *g*.

As the door is closed the abrupt striking-face of the lever D strikes against the door-jamb or striker-plate, and said lever is thereby turned upon its pivot in the arc of a circle, and pushed inward and rearward toward the handle of the latch, and overcomes the stress of the spring C, and retracts the bolt without the latter coming in contact with the said door-jamb until it enters its socket in the latter.

The bolt B may be actuated by its handles and spindle independently of the lever D.

As the door is being entirely closed the wiping effect of the door-jamb upon the lever D gradually increases, owing to the fact that the fulcrum of the lever recedes from such door-jamb; and by this means I obtain the greatest power over the bolt at the time most needed—that is, as its nose retreats within the case A, as it is at this time that the spring C offers the greatest resistance.

In the present usual construction of locks and latches for doors, &c., the action of the door-jamb upon the projecting nose of the bolt tends to crowd the body of the latter against the plate A of the latch, more power being required to overcome the friction between the bolt and case than to retract the spring which advances the bolt, and this resistance multiplies rapidly as the thickness of the bolt is reduced and the angle of its slope becomes more obtuse.

In my invention, practically, the only power requisite to be overcome is the resistance of the spring, for the reason that there is no frictional contact between the beveled face of the latch-bolt and the striker-plate of the door-jamb, and the small amount of such contact between the nose of the lever D and such plate becomes unimportant as a resistance to be overcome, in consequence of the fact that such lever is arranged to vibrate upon a pivot. I also provide a powerful and direct leverage to effect the latch compression of the spring, and, as before stated, automatically increase this leverage as the resistance of the spring increases.

It will be seen that the striking-face of the lever D is parallel with the holding-face of the latch-bolt, and this secures a more prompt and direct leverage as between the door-jamb or striker-plate and the lever than would be the case if the striking-face of the lever were inclined like the latch-face of a bolt.

A great advantage in my invention is seen in the fact that I am enabled to produce a mortise-lock of the thinnest class, and which contains a thin bolt which shall possess all the advantages of a thick bolt whose nose is formed with an acute-angled slope. I also avoid much of the wear which now ensues between the bolt and door.

What is claimed as the invention, and is desired to be secured by Letters Patent, is—

1. The combination, with a latch-bolt, of a pivoted operating-lever, the outer end of which, in forcing back the bolt, moves in the arc of a circle more rapidly than the bolt in receding, and which is provided with a striking-face projecting at an abrupt angle from the face-plate, substantially as described.

2. The combination, by means of a pin-and-slot connection, of the sliding spring latch-bolt and operating-lever, pivoted as described, whereby the said lever is made to vibrate backward when the latch-bolt is retracted by the turning of the knob-spindle, substantially as specified.

3. The combination, with a latch-bolt, of an operating-lever having a striking-face which is parallel with the holding-face of the latch-bolt, substantially as described.

4. The operating-lever, in combination with a latch-bolt having an angular edge against which the operating-lever abuts, substantially as described.

5. The combination, with a latch-bolt which is limited to a longitudinal movement, of a bell-crank lever which is operatively connected with the bolt and case by a single pivot, substantially as described.

FRANCIS D. ROBINSON.

Witnesses:
GEO. W. CUMMINGS,
THOMAS G. BANKS.